United States Patent Office 3,098,839
Patented July 23, 1963

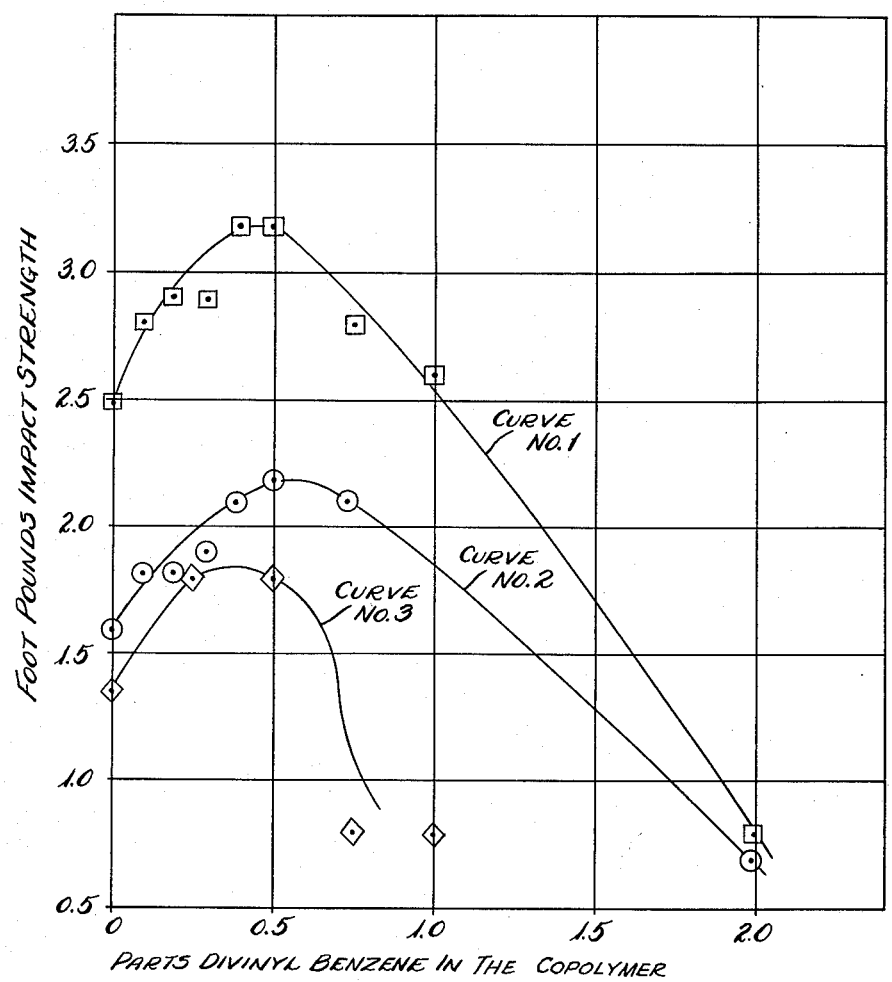

3,098,839
BLEND OF POLYSTYRENE, STYRENE-POLYBUTADIENE GRAFT COPOLYMER AND CONJUGATED DIENE-DIVINYLBENZENE COPOLYMER
Wendell R. Conard, Kent, and Robert J. Reid, Fulton, Ohio, assignors to The Firestone Tire & Rubber Company, Akron, Ohio, a corporation of Ohio
Filed Apr. 21, 1961, Ser. No. 104,603
7 Claims. (Cl. 260—45.5)

This invention relates to a high-impact polystyrene which is, in fact, a three-component blend having high impact strength. The invention includes processes of producing this blend.

The blend comprises 80 to 95 percent polystyrene. The polystyrene is referred to herein as the first component of the blend. The second component which comprises 2 to 8 percent of the whole is a graft of 30 to 50 percent of styrene on 70 to 50 percent polybutadiene. The third component which comprises 3 to 12 percent of the whole, is a copolymer which is prepared in emulsion from a mixture of monomers which includes 0.1 to 1.0 percent divinyl benzene (referred to herein as DVB). The remainder of the copolymer constituting the third component contains 99.9 to 85 percent of a hydrocarbon conjugated diene of 4 to 5 carbon atoms and up to 15 percent of styrene. Thus this third component polymer may be (1) a copolymer of a small amount of DVB with butadiene, isoprene, or piperylene or (2) a copolymer of a small amount of DVB with two or all three of said monomers or (3) a copolymer of a small amount of DVB with a mixture of styrene and one of said monomers.

Hayes U.S. Patent 2,755,270 discloses a three-component high-impact styrene resin with DVB copolymerized with the butadiene of the graft copolymer base. Tests have been made on a similar three-component blend having DVB in the second component—the graft copolymer. The following table shows the lowering of the impact strength of the blend by such addition:

| Composition | Control (Parts) | Test (Parts) |
|---|---|---|
| Polystyrene | 90 | 90 |
| Styrene on Butadiene Polymer (40/60) | 6.66 | 6.66 |
| Percent DVB in Butadiene Polymer | 0 | 1 |
| Polybutadiene | 3.33 | 3.33 |
| Notched Impact (Ft. Lbs.) | 2.0 | 1.2 |
| Hardness (Rockwell M) | 35 | 34 |

In preparing the foregoing test stock 0.6 part of DVB was added to 60 parts of butadiene from which the base of the graft copolymer was prepared. Forty parts of styrene was grafted on to the resulting polymer. The impact strength of the blend dropped appreciably as indicated.

According to this invention a small amount of DVB is copolymerized with the one or more monomers which form the third component, and a blend with an unexpectedly high impact strength is obtained from the resulting polymer component. If the third component is formed from DVB and one or more 4- and 5-carbon hydrocarbon diene monomers, the amount of DVB used in the polymer bath is advantageously 0.1 to 1.0 percent of the total monomer present. If the polymerization reaction in which the third component is formed contains styrene in an amount herein contemplated, the amount of DVB present should not exceed about 0.6 percent of the total monomer present and may be as low as 0.1 percent.

The invention is illustrated by reference to the accompanying drawing which shows three curves representing the effect on the impact strength (Izod-Notched) of additions of different amounts of DVB to the polymerization recipe from which the third component is obtained. The formulae used in producing the curves are:

| Composition | Curve No. 1 | Curve No. 2 | Curve No. 3 |
|---|---|---|---|
| Component: | | | |
| No. 1—Polystyrene | 85 | 90 | 90 |
| No. 2—Styrene on polybutadiene (40/60) | 5 | 3.33 | 3.33 |
| No. 3—Butadiene DVB copolymer | 10 | 6.66 | |
| No. 3—Butadiene-styrene (90/10) DVB terpolymer | | | 6.66 |

Curve No. 1 illustrates the effect on the blend impact strength of copolymerizing 0.0, 0.1, 0.2, 0.3, 0.4, 0.5, 0.75, 1.0 and 2.0 parts of DVB with the butadiene in the above formula for the third component of the blend. The impact strength of the blend increased to a maximum when between about 0.4 and 0.7 part of DVB was added to the butadiene.

Curve No. 2 shows the effect on the blend impact strength of copolymerizing 0.0, 0.1, 0.2, 0.3, 0.4, 0.5, 0.75 and 2.0 parts of DVB with the butadiene in the above formula for the third component of this blend. The impact strength of the blend increased to a maximum when between about 0.4 and 0.7 part of DVB was copolymerized with the butadiene.

With the blends represented by both curves No. 1 and 2, the peak impact strength was obtained with 0.5 part of DVB per 100 parts of butadiene.

In the blends represented by curve No. 3, the maximum impact strength was obtained when between 0.2 and 0.6 part of DVB was added per 100 parts of butadiene and styrene, before copolymerization of the same, the peak being obtained with 0.3 to 0.4 part of DVB.

Each of the second and third components may be prepared by any usual emulsion polymerization process using a free-radical catalyst using at least one monomer in the original polymerization mixture, and adding a small amount of other monomer before or after polymerization thereof. The production of polystyrene is too well known to need illustration. Bulk, suspension and emulsion polymerized polystyrenes can be used.

A typical example of the preparation of the styrene on butadiene graft copolymer to be used as the second component follows:

Formula:
    Polybutadiene (in latex) _____ 90
    Styrene (rubber grade) _____ 60
    Water to make charge with 33.3% total solids.
Conditions:
    Polymerization temperature _____° C__ 70
    Polymerization time _____hours__ 6
    Complete conversion: total solids, percent__above 33

A typical example of the preparation of polybutadiene (without reference to the DVB), to be used as the third component, follows:

Formula:
    Butadiene _____ 100
    Water _____ 330
    Sodium soap flakes _____ 7.5
    $K_2S_2O_8$ _____ 0.7
    Dodecyl mercaptan _____ 0.05
Conditions:
    Polymerization temperature _____° C__ 60
    Polymerization time _____hours__ 24
    Complete conversion: total solids____percent__ 24.5

For the butadiene-styrene copolymer of curve No. 3, the same recipe may be used as that just given for polybutadiene, substituting 10 parts of styrene for 10 parts of the butadiene. The same or similar recipes can be used for producing the homopolymers and other copolymers to be used for the second and third components.

The blends are advantageously prepared by mixing latexes of the second and third components, and coagulating the mixture; and then after drying, blending the resulting mixture of polymers with polystyrene, as by milling or otherwise suitably mixing the two together on a heated mill which heats the stock to about 335 to 345° F. Alternatively, latexes of all three components may be blended and co-agulated, or the individual polymers may be isolated and blended on a mill or in an extruder or internal mixer, etc.

The term "butadiene" is used herein to refer to butadiene-1,3.

The invention is covered in the claims which follow.

What we claim is:

1. A blend of (1) 80 to 95 percent polystyrene, (2) 2 to 8 percent of a graft copolymer of 30 to 50 percent of styrene on 70 to 50 percent of polybutadiene, and (3) 3 to 12 percent of a copolymer which is prepared in emulsion from a mixture of monomers containing a small amount of divinyl benzene, which copolymer is of the class consisting of (a) a copolymer consisting of hydrocarbon conjugated dienes containing 4 to 5 carbon atoms and 0.4 to 0.7 percent of divinyl benzene based on the polymerized diene and (b) a copolymer consisting of butadiene, styrene and divinyl benzene containing up to 15 percent of styrent with 0.2 to 0.6 percent of divinyl benzene based on the total weight of the styrene and butadiene.

2. The blend of claim 1 in which a copolymer present in the amount of 3 to 12 percent is butadiene-divinyl benzene copolymer.

3. The blend of claim 1 in which the copolymer present in the amount of 3 to 12 percent is a copolymer of butadiene, styrene and divinyl benzene containing up to 15 percent of styrene.

4. The blend of claim 1 which contains substantially (a) 85 percent of polystyrene, (b) 5 percent of the graft copolymer of 40 parts of styrene on 60 parts of polybutadiene, and (c) 10 percent of the copolymer of 0.5 part of divinyl benzene and 100 parts of butadiene.

5. The blend of claim 1 which contains substantially (a) 90 percent of polystyrene, (b) 3.33 percent of the graft copolymer of 40 parts of styrene on 60 parts of polybutadiene, and (c) 6.66 percent of the copolymer of 0.5 part of divinyl benzene and 100 parts of butadiene.

6. The blend of claim 1 which contains substantially (a) 90 percent of polystyrene, (b) 3.33 percent of the graft copolymer of 40 parts of styrene on 60 parts of polybutadiene, and (c) 6.66 percent of the copolymer of 90 parts of butadiene and 10 parts of styrene with 0.3 to 0.5 part of divinyl benzene.

7. The process of producing the blend of claim 1 in which latexes of components (2) and (3) are coagulated and the resulting coagulum is blended with the polystyrene.

References Cited in the file of this patent

UNITED STATES PATENTS 2,755,270     Hayes _____ July 17, 1956

FOREIGN PATENTS 228,332     Australia _____ May 14, 1959